United States Patent
Na et al.

(10) Patent No.: US 7,791,908 B2
(45) Date of Patent: Sep. 7, 2010

(54) SWITCHING MODE POWER SUPPLY (SMPS) DEVICE, IMAGE FORMING APPARATUS INCLUDING THE SMPS DEVICE, AND METHOD OF DRIVING THE SMPS DEVICE

(75) Inventors: Tae-kwon Na, Seoul (KR); Doo-hyo Moon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 598 days.

(21) Appl. No.: 11/692,455

(22) Filed: Mar. 28, 2007

(65) Prior Publication Data
US 2008/0031015 A1 Feb. 7, 2008

(30) Foreign Application Priority Data
Aug. 4, 2006 (KR) ........................ 10-2006-0073646

(51) Int. Cl.
*H02M 3/335* (2006.01)
(52) U.S. Cl. .................................... 363/21.02
(58) Field of Classification Search ................ 363/15, 363/16, 18, 19, 20, 21.01, 21.02, 97; 323/282, 323/284, 285, 293, 351, 352
See application file for complete search history.

(56) References Cited

U.S. PATENT DOCUMENTS 4,820,891 A * 4/1989 Tanaka et al. ................ 219/626

* cited by examiner

*Primary Examiner*—Gary L Laxton
(74) *Attorney, Agent, or Firm*—Staas & Halsey LLP

(57) ABSTRACT

A switching mode power supply (SMPS) device includes a power converting part that converts an input voltage into an output voltage according to a switching signal, and outputs a primitive switching signal for use in varying a frequency of the switching signal based on power drawn by a load receiving the output voltage; a resonant circuit that changes a duty ratio of the primitive switching signal using a variable resonant frequency in accordance with a variance of an impedance of the load; and a signal controlling part that compares a voltage of the primitive switching signal, resonated in accordance with the variable resonant frequency, with a reference voltage, and varies the frequency of the switching signal and outputs the switching signal having the varied frequency when the voltage of the primitive switching signal is maintained below the reference voltage for longer than a reference time.

26 Claims, 4 Drawing Sheets

SWITCHING MODE POWER SUPPLY (SMPS) DEVICE, IMAGE FORMING APPARATUS INCLUDING THE SMPS DEVICE, AND METHOD OF DRIVING THE SMPS DEVICE

CROSS-REFERENCE TO RELATED APPLICATIONS

This application claims the benefit of Korean Patent Application No. 2006-73646 filed on Aug. 4, 2006, in the Korean Intellectual Property Office, the disclosure of which is incorporated herein by reference in its entirety.

BACKGROUND OF THE INVENTION

1. Field of the Invention

An aspect of the invention relates to a switching mode power supply (SMPS) device, an image forming apparatus including the SMPS device, and a method of driving the SMPS device. More particularly, an aspect of the invention relates to a switching mode power supply device capable of preventing electromagnetic interference from occurring due to impedance variance, and reducing power consumption, and an image forming apparatus including the SMPS device, and a method of driving the SMPS device.

2. Description of the Related Art

An image forming apparatus, such as a printer, a photocopier, a facsimile machine, and a multifunctional device capable of combining the functionality of several different pieces of office equipment into a single machine, is a device for printing an image on a print medium by executing a print operation corresponding to an input data.

The image forming apparatus requires a power supply device to convert an AC input voltage into a DC output voltage and supply the DC output voltage to the respective parts such as a print controlling part which has a microcontroller to control printing operation, or a print engine part which accommodates a stack of print media such as printing paper, prints an image onto a print medium, and discharges the print medium with the image formed thereon.

A switching mode power supply (SMPS) device rectifies and smoothes commercial AC into DC, and converts the DC to a high frequency such as 100 kHz, so that an appropriate voltage can be obtained by the transformer.

Methods of controlling an output voltage of an SMPS device generally include a pulse-width modulation (PWM) method of controlling a duty ratio of a switching pulse according to an output voltage variation; a method of controlling a frequency of the switching pulse; and a method of controlling a phase of the switching pulse.

Recently, the functions of the image forming apparatus have been diversified and complicated, and reducing electric power consumption thereof is highly desirable. Accordingly, various methods have been tried to reduce electric power consumption of an SMPS device.

A quasi-resonant control has been applied to an SMPS device as one way of reducing electric power consumption.

The method of quasi-resonant control will be briefly described below.

FIG. 6 is a circuit diagram illustrating a part of an SMPS device performing the quasi-resonant control according to the related art. FIG. 7 is a graph illustrating waveforms in the SMPS device of FIG. 6, and FIG. 8 is a graph explaining the operation of the SMPS device in response to the waveforms illustrated in FIG. 7.

In the quasi-resonant control, the MOS transistor (M_TR) triggers a new cycle by starting a turn-on state when a voltage difference across the M_TR reaches the minimum voltage during switching from the turn-on state to a turn-off state. Accordingly, as the electric power consumption in the M_TR is reduced, the electric power consumption of the SMPS device is also reduced.

Referring to FIGS. 6 through 8, the controller (IC) outputs a switching signal of a predetermined frequency to control switching of the M_TR in response to a voltage supply VCC. Accordingly, a DC input voltage DC_IN that was obtained from an external power supply is rectified and smoothed, and is supplied to the primary winding L11 of the transformer in a predetermined pulse form in accordance with a switching signal as shown in the top half of FIG. 7, which is detected at the point P3 in FIG. 6.

Accordingly, a primitive switching signal having substantially the same frequency as the switching signal is generated at the secondary winding L12 of the transformer, resonated at the resonant frequency which is formed according to the inductance of the secondary winding L12 and the capacitance of the capacitor C11, and input into the controller IC in pulse form as shown in the bottom half of FIG. 7, which is detected at the point P4 in FIG. 6. The primitive switching signal is generated and receives a feedback according to the switching signal of the predetermined frequency which controls switching of the M_TR. The term "primitive switching signal" herein means a signal previously generated in order to output the switching signal by a quasi-resonant control method.

The circuit in FIG. 6 also includes resistors R11, R12, R13, R14, and R15 connected as shown in FIG. 6.

The controller IC drives the SMPS device using quasi-resonant controlling by detecting the voltage of the switching signal having a reference voltage such as 0 voltage, for example, and outputting a switching signal to the M_TR when the time period during which the switching signal below 0 voltage is supplied exceeds a reference time, such as 8 μs, for example.

However, the SMPS device with the above construction has a problem in that the resonance continues until the core is reset according to the inductance and capacitance. Additionally, because the controller IC outputs a switching signal whenever it detects 0 voltage and then voltage under 0 for more than a reference time, current is induced low and switching frequency increases when a light load is driven by the output of the SMPS device.

Electromagnetic interference (EMI) is detected from the harmonics in the low-frequency signal. However, the EMI is detected from the initial frequency component in the high-frequency signal, which causes the increased switching frequency and deterioration of EMI characteristics.

Additionally, as the switching signal is outputted at a shorter interval, turn-on and turn-off operations of M_TR increase with the supply of the light load, compared to when a heavy load is supplied, which subsequently increases power consumption of the M_TR and the SMPS device.

SUMMARY OF THE INVENTION

According to aspects of the invention, there are provided a switching mode power supply (SMPS) device for preventing EMI degradation due to an impedance variance of a load, and for reducing electric power consumption in the SMPS device; an image forming apparatus including the SMPS device; and a method of driving the SMPS device.

According to an aspect of the invention, a switching mode power supply (SMPS) device includes a power converting part that converts an input voltage into an output voltage according to a switching signal, and outputs a primitive switching signal for use in varying a frequency of the switching signal based on power drawn by a load receiving the output voltage; a resonant circuit that changes a duty ratio of the primitive switching signal using a variable resonant frequency in accordance with a variance of an impedance of the load; and a signal controlling part that compares a voltage of the primitive switching signal, resonated in accordance with the variable resonant frequency, with a reference voltage, and varies the frequency of the switching signal and outputs the switching signal having the varied frequency when the voltage of the primitive switching signal is maintained below the reference voltage for longer than a reference time.

According to an aspect of the invention, the resonant circuit includes an impedance detecting part that detects the variance of the impedance of the load and outputs a duty ratio control signal in accordance with the detected impedance; and a duty ratio adjusting part changes the duty ratio of the primitive switching signal in response to the duty ratio control signal.

According to an aspect of the invention, the duty ratio adjusting part includes a first capacitor to resonate the primitive switching signal; a first switching part activated in response to the duty ratio control signal; and a second capacitor connected in series with the first switching part, the series connection of the second capacitor and the first transistor being connected in parallel with the first capacitor so that the second capacitor forms a variable resonant frequency of the resonant circuit in cooperation with the first capacitor when the first switching part is activated.

According to an aspect of the invention, the impedance detecting part includes a third capacitor that is formed to have a charging voltage varying in accordance with the variance of the impedance of the load, and outputs the charging voltage as the duty ratio control signal.

According to an aspect of the invention, the SMPS device further includes an overcurrent detecting part that outputs an overcurrent detection signal to the signal controlling part when an overcurrent flows through the power converting part.

According to an aspect of the invention, the resonant circuit is connected in parallel with the overcurrent detecting part.

According to an aspect of the invention, the power converting part further includes a second switching part that varies the input voltage by being activated in response to the switching signal.

According to an aspect of the invention, the power converting part includes a primary winding to which the input voltage is supplied; a first secondary winding coupled to the primary winding and inducing the output voltage; and a second secondary winding coupled to the primary winding and inducing the primitive switching signal.

According to an aspect of the invention, the resonant circuit includes a first capacitor that is connected to the second secondary winding and outputs the resonated primitive switching signal; a second capacitor; and a first transistor connected in series with the second capacitor, the series connection of the first transistor and the second capacitor being connected in parallel with the first capacitor, the first transistor being activated in accordance with the variance of the impedance of the load to selectively connect the first capacitor and the second capacitor in parallel.

According to an aspect of the invention, the power converting part further includes a second transistor that changes the input voltage supplied to the primary winding in response to the switching signal.

According to an aspect of the invention, the SMPS device further includes a resistor connected to the second transistor that outputs a voltage difference across the resistor as an overcurrent detection signal to the signal controlling part when an overcurrent flows in the primary winding.

According to an aspect of the invention, the resonant circuit further includes a third capacitor connected in parallel with the resistor that is charged to a certain voltage in accordance with the voltage difference across the resistor that varies according to the variance of the impedance of the load, and outputs the charged voltage as a duty ratio control signal to the first transistor.

According to an aspect of the invention, there is provided an image forming apparatus that receives an input voltage and print data, and performs printing in accordance with the print data, the image forming apparatus including a print controlling part that receives the print data and converts the print data into a bitmap image; a print engine part that prints the bitmap image onto a print medium; and a switching mode power supply (SMPS) device that converts input voltage into one or more output voltages received by the print controlling part and the print engine part according to a switching signal, and varies a frequency of the switching signal in accordance with operation modes of the print controlling part and the print engine part.

According to an aspect of the invention, the operation modes include a printing mode in which the print engine part and the print controlling part are activated and operate to print the bitmap image onto the print medium, and a standby mode in which the print engine part and the print controlling part are inactivated; and wherein the SMPS device varies the frequency of the switching signal in the standby mode.

According to an aspect of the invention, the SMPS device includes a power converting part that converts the input voltage into the one or more output voltages according to the switching signal, and outputs a primitive switching signal for use in varying the frequency of the switching signal based on power drawn by the print engine part and the print controlling part receiving the one or more output voltages; a resonant circuit that changes a duty ratio of the primitive switching signal using a variable resonant frequency in accordance with a variance of an impedance of the print engine part and the print controlling part receiving the one or more output voltages; and a signal controlling part that compares a voltage of the primitive switching signal, resonated in accordance with the variable resonant frequency, with a reference voltage, and varies the frequency of the switching signal and outputs the switching signal having the varied frequency when the voltage of the primitive switching signal is maintained below the reference voltage for longer than a reference time.

According to an aspect of the invention, there is provided a method of driving a switching mode power supply (SMPS) device that converts an input voltage into an output voltage according to a switching signal, and supplies the output voltage to a load, the method including determining a variance of an impedance of the load; and varying a frequency of the switching signal when power supplied to the load is determined to decrease.

According to an aspect of the invention, the varying of the frequency of the switching signal includes generating a primitive switching signal for use in varying the frequency of the switching signal; varying a resonant frequency to vary a duty ratio of the primitive switching signal; and resonating the primitive switching signal in accordance with the varied resonant frequency.

According to an aspect of the invention, the varying of the frequency of the switching signal includes comparing a voltage of the primitive switching signal, resonated in accordance with the variable resonant frequency, with a reference voltage; and varying the frequency of the switching signal and outputting the switching signal having the varied frequency when the voltage of the primitive switching signal is maintained below the reference voltage for longer than a reference time.

According to an aspect of the invention, the varying of the resonant frequency includes increasing a capacitance that determines the resonant frequency, thereby changing the duty ratio of the primitive switching signal.

According to an aspect of the invention, a switching mode power supply (SMPS) device includes a power converting part that receives an input voltage, receives a switching signal having a controlled frequency, converts the input voltage into an output voltage according to the switching signal having the controlled frequency, outputs the output voltage to a load, and outputs a primitive switching signal for use in controlling a frequency of the switching signal having the controlled frequency based on power drawn by the load; a resonant circuit that receives the primitive switching signal, resonates the primitive switching signal at a resonant frequency determined by the power drawn by the load, and outputs the resonated primitive switching signal; and signal controlling part that receives the resonated primitive switching signal, generates a switching signal, controls a frequency of the switching signal in accordance with the resonated primitive switching signal, and outputs the switching signal having the controlled frequency to the power converting part.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Figure 1:
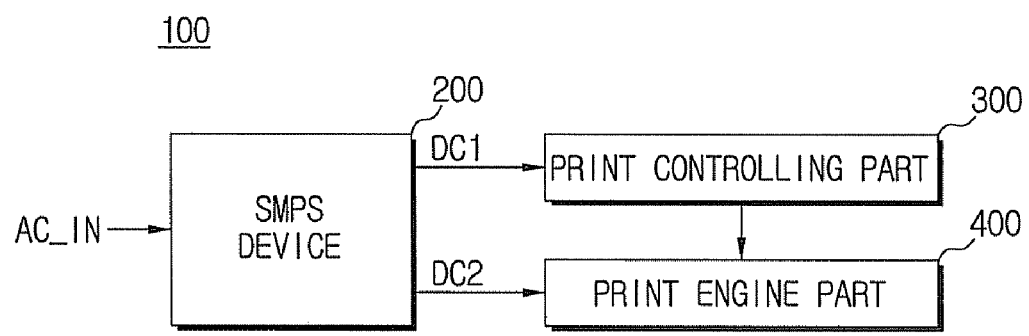
FIG. 1 is a block diagram of an image forming apparatus according to an aspect of the invention.

Reference will now be made in detail to embodiments of the invention, examples of which are shown in the accompanying drawings, wherein like reference numerals refer to like elements throughout. The embodiments are described below in order to explain the invention by referring to the figures.

FIG. 1 is a block diagram of an image forming apparatus according to an aspect of the invention.

Referring to FIG. 1, the image forming apparatus 100 according to an aspect of the invention includes a switching mode power supply (SMPS) device 200, a print controlling part 300, and a print engine part 400.

The SMPS device 200 converts an AC input voltage (AC_IN) into DC, decompresses the DC voltage, and provides the print controlling part 300 and the print engine part 400 of the image forming apparatus 100 with DC output voltages DC1, DC2.

According to an aspect of the invention, the SMPS device 200 uses a PWM transformation method in order to output the output voltages DC1, DC2 to the print controlling part 300 and the print engine part 400 which are disposed inside the image forming apparatus 100, and a quasi-resonant control method to reduce electric power consumption in operating the internal elements to generate the output voltages DC1, DC2 of the power supply part 200.

According to an aspect of the invention, when the SMPS device 200 operates according to the quasi-resonant control method, the SMPS device 200 detects the impedance variance in order to prevent electromagnetic interference (EMI) deterioration according to the impedance variance by the loads such as the print controlling part 300 and the print engine part 400 which are connected with the SMPS device 200 and receive the output voltages DC1, DC2 from the SMPS device 200, and adaptively controls the frequency of a switching signal to generate the output voltages DC1, DC2, according to the detection.

Detailed description with respect to the SMPS device 200 will be described in FIGS. 2 through 5.

The print controlling part 300 is driven by the first DC output voltage DC1 outputted from the SMPS device 200 and controls an overall operation of the image forming apparatus 100, such as receiving of print data from a user, conversion of the received print data into a bitmap image, and output of a drive control signal to control the respective components of the print engine part 400.

More specifically, the print controlling part 300 controls an overall operation of the print engine part 400, including loading and conveyance of print media, formation of an image on a print medium from a bitmap image, and also controls an overall operation of the image forming apparatus 100, including determination of print errors such as a paper jam or the like.

The print controlling part 300 also controls the print engine part 400 to operate in a standby mode and not perform any printing operation when no print data is inputted.

If the image forming apparatus 100 is a laser printer, for example, the print engine 400 includes a photosensitive drum, a developing device, a fuser, and a laser scanning unit (LSU) that emits a laser beam onto the photosensitive drum.

The elements of the print engine part 400 are driven in accordance with the second DC voltage DC2 outputted from the SMPS device 200 and a control signal outputted from the print controlling part 300, and forms an image on the print medium based on the bitmap image received from the print controlling part 300.

According to one aspect of the invention, the impedance of the loads of the SMPS device 200 decreases when the print controlling part 300 and the print engine part 400 are operated in the standby mode, and the SMPS device 200 controls the frequency of a switching signal to generate the output voltages DC1, DC2 in accordance with the changes of the loads.

In this particular example, one SMPS device 200 is provided to generate the first and the second DC output voltages DC1, DC2. However, two SMPS devices 200 may be provided to independently generate the first and second DC output voltages DC1, DC2. Alternatively, one SMPS device 200 may generate more than two DC output voltages depending on the voltage requirements of the elements of the image forming apparatus 100.

Figure 2:
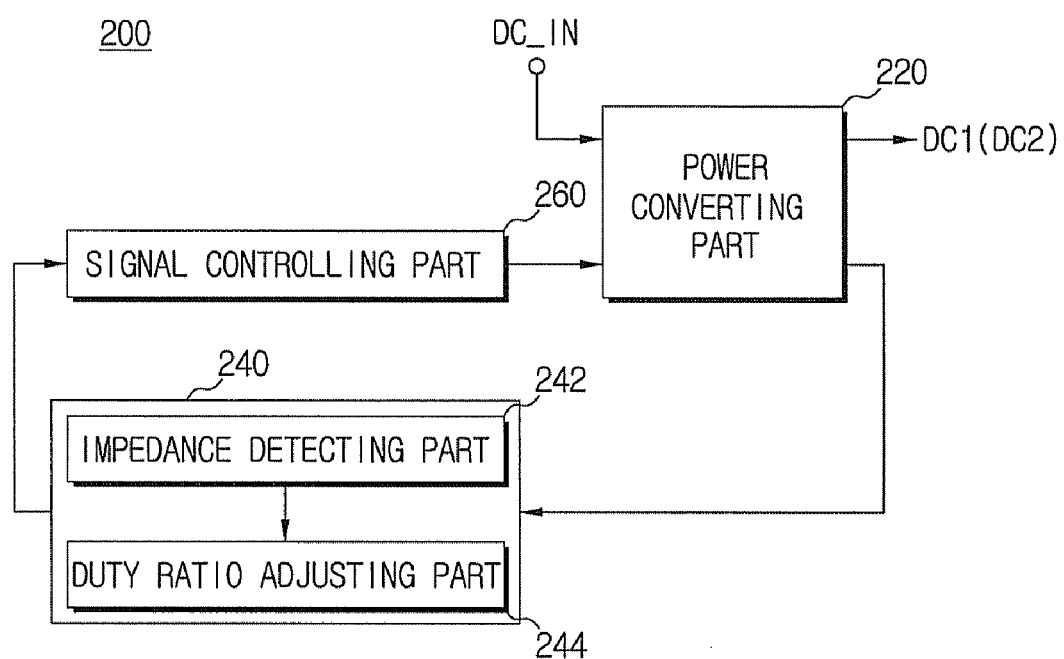
FIG. 2 is a block diagram of a switching mode power supply (SMPS) device of FIG. 1 according to an aspect of the invention.

FIG. 2 is a block diagram of the SMPS device of FIG. 1 according to an aspect of the invention.

Referring to FIG. 2, the SMPS device 200 according to an aspect of the invention includes a power converting part 220, a resonant circuit 240, and a signal controlling part 260.

The SMPS device 200 has the same construction as that of the SMPS device 200 illustrated in FIG. 1.

More specifically, the power converting part 220 receives an input voltage DC_IN, which was obtained by rectifying and smoothing an input AC voltage AC_IN, reduces the voltage DC_IN to obtain the output voltages DC1, DC2, and provides the print controlling part 300 and the print engine part 400 of the image forming apparatus 100 with the DC output voltages DC1, DC2 for use inside the image forming apparatus 100.

The power converting part 220 performs control so that the input voltage DC_IN is supplied to the SMPS 200 according to a switching signal. Accordingly, the input voltage DC_IN is supplied to the power converting part 220 in a pulse form so that pulses of the input voltage DC_IN alternate with pulses of 0 voltage.

Additionally, the power converting part 220 generates a primitive switching signal for use in varying a frequency of the switching signal using the input voltage DC_IN, and outputs the primitive switching signal.

The resonant circuit 240 includes an impedance detecting part 242 and a duty ratio adjusting part 244.

More specifically, the impedance detecting part 242 detects the impedance varying in accordance with the operation mode of the print engine part 400 connected with the power converting part 220, and outputs a duty ratio control signal to control adjustment of a duty ratio of the primitive switching signal.

The duty ratio control signal having high voltage level is outputted when the impedance of the loads of the power converting part 220 increases, while the duty ratio control signal having a low voltage level is outputted when the impedance of the loads of the power converting part 220 decreases.

The duty ratio adjusting part 244 controls the duty ratio of the primitive switching signal outputted from the power converting part 220 in accordance with the duty ratio control signal which is outputted from the impedance detecting part 242 having a varying voltage level in accordance with the impedance of the loads of the power converting part 220.

According to an aspect of the invention, the duty ratio adjusting part 244 is inactivated when the duty ratio control signal having the high voltage level is supplied such that the primitive switching signal is resonated based on a predetermined resonant frequency and outputted. The duty ratio adjusting part 244 is activated when the duty ratio control signal having the low voltage level is supplied such that the primitive switching signal is resonated based on the variance resonant frequency, which is the predetermined resonant frequency combined with another resonant frequency, and outputted.

The signal controlling part 260 receives the primitive switching signal with the varied or unvaried duty ratio from the resonant circuit 240, and generates a switching signal to generate the output voltages DC1, DC2.

The signal controlling part 260 varies the frequency of the switching signal and outputs the switching signal with the varied frequency in response to the primitive switching signal with the varied duty ratio, and maintains unvaried the frequency of the switching signal and outputs the switching signal with the unvaried frequency in response to the primitive switching with the unvaried duty ratio.

The operation of the SMPS 200 according to an aspect of the invention will be explained in detail below.

Figure 3:
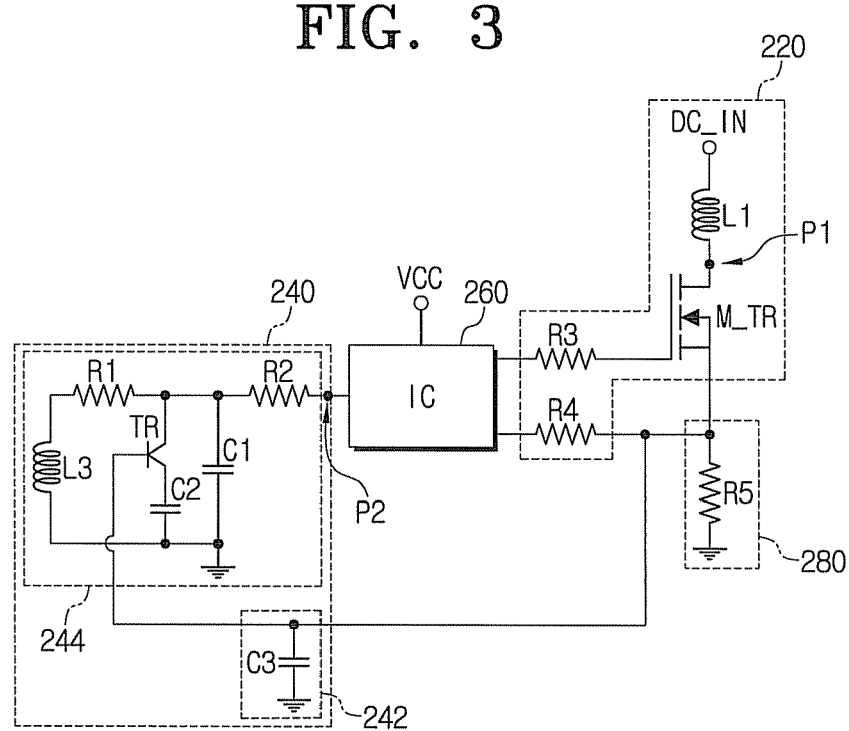
FIG. 3 is a circuit diagram of a portion of the SMPS device of FIG. 2 according to an aspect of the invention.
Figure 4:
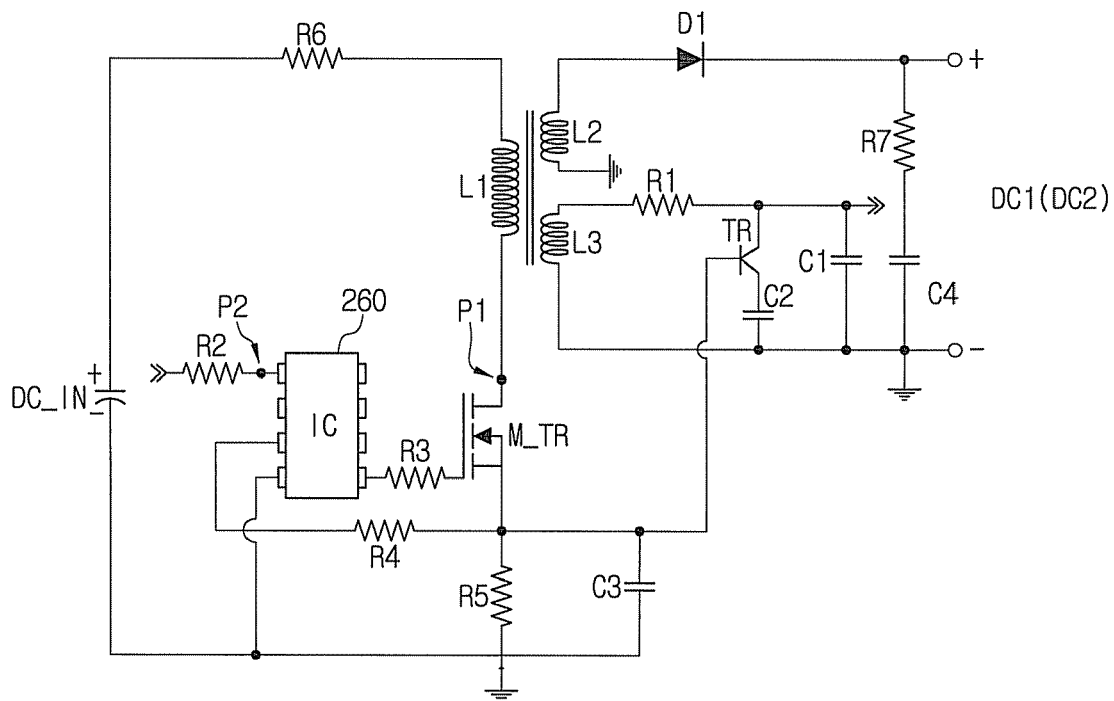
FIG. 4 is another circuit diagram of the SMPS device according to an aspect of the invention.

FIG. 3 is a circuit diagram of a portion of the SMPS device of FIG. 2 according to an aspect of the invention, and FIG. 4 is another circuit diagram of the SMPS device according to an aspect of the invention.

More specifically, FIG. 3 shows a circuit diagram of a portion of the SMPS device to vary the frequency of the switching signal in which the SMPS device adopts quasi-resonant controlling in an attempt to reduce power consumption, and FIG. 4 is a circuit diagram schematically showing the overall structure of the SMPS device incorporating the circuit of FIG. 3 in a rearranged form.

Referring to FIGS. 2 to 4, the SMPS device according to an aspect of the invention includes a power converting part 220, a resonant circuit 240, a signal controlling part 260, and an overcurrent detecting part 280.

The power converting part 220 includes a transformer that includes a primary winding L1 through which the input voltage DC_IN is input, a first secondary winding L2 inductively coupled to the primary winding L1 and generating the output voltages DC1, DC2, and a second secondary winding L3 inductively coupled to the primary winding L1 and generating a primitive switching signal.

The power converting part 220 includes an MOS transistor M_TR which is connected in series with the primary winding L1 and causes a pulsating input voltage DC_IN to flow through the primary winding L1 and be inductively coupled to the secondary windings L2, L3.

The M_TR is turned on and off in response to the switching signal, and the input voltage DC_IN is pulsated in a predetermined pulse form in accordance with the switching of the M_TR and supplied to the primary winding L1. Induced voltages, which are reduced voltages according to the input voltage DC_IN input to the primary winding L1, and the turns ratio of the primary and the secondary windings L1, L2, L3, are formed in the secondary windings L2, L3.

The induced voltage in the first secondary winding L2 is rectified and smoothed by the rectifier D1 and a capacitor C4 and output as the output voltages DC1, DC2, and the induced voltage in the second secondary winding L3 is supplied to the resonant circuit 240 as a primitive switching signal for use in varying the frequency of the switching signal.

The overcurrent detecting part 280 connected with the power converting part 220 will be explained below.

The overcurrent detecting part 280 is connected with a source terminal of the M_TR to detect an overcurrent and provides the signal controlling part 260 with an overcurrent detection signal when an overcurrent flows through the M_TR.

To this end, the overcurrent detecting part 280 includes resistors R4, R5 connected with the M_TR, and provides the signal controlling part 260 with the voltage divided by the resistors R4, R5 as an overcurrent detection signal. More specifically, the source terminal of the M_TR has a relatively high level of voltage compared to a normal state when an overcurrent flows through the M_TR. The high voltage at the source terminal is divided by the resistors R4, R5 and supplied to the signal controlling part 260 such that the signal controlling part 260 blocks the switching signal and turns off the M_TR when the received voltage exceeds an acceptable range. Accordingly, the components inside the SMPS device 200 are protected from the overcurrent.

The resonant circuit 240 includes an impedance detecting part 242 and a duty ratio adjusting part 244.

The impedance detecting part 242 is connected in parallel with the overcurrent detecting part 280 with respect to the source terminal of the M_TR. The impedance detecting part 242 detects the impedance of the loads of the power converting part 220 and outputs a duty ratio adjustment signal. More specifically, when the loads of the power converting part 220 have a relatively high impedance, such as in a printing mode when the print engine part 400 connected to the power converting part 220 has an increased impedance to perform printing, current flowing in the primary winding L1 of the power converting part 220 increases, and accordingly the amount of current flowing to the impedance detecting part 242 also increases.

On the contrary, when the loads of the power converting part 220 have a relatively low impedance, such as in the standby mode, the amount of electric current flowing in the primary winding L1 of the power converting part 220 decreases, and accordingly the amount of electric current flowing through the impedance detecting part 242 also decreases.

The impedance detecting part 242 includes a capacitor C3 to detect the variance of the electric current, and output a duty ratio control signal. As explained above, a relatively high level of voltage is formed at the capacitor C3 in the printing mode, and a relatively low level of voltage is formed at the capacitor C3 in the standby mode. The charging voltage of the capacitor C3 is supplied as a duty ratio control signal to the duty ratio adjusting part 244.

The duty ratio adjusting part 244 variably forms the resonant frequency of the resonant circuit 240 in accordance with the duty ratio control signal outputted from the impedance detecting part 242. To this end, the duty ratio adjusting part 244 includes a first capacitor C1, a switching part TR, and a second capacitor C2.

The first capacitor C1 determines the resonant frequency of the resonant circuit 240.

The switching part TR may be a PNP type transistor, for example, and receives a duty ratio control signal from the impedance detecting part 242 and is selectively activated according to the duty ratio control signal.

More specifically, the switching part TR is inactivated in accordance with the duty ratio control signal having high level voltage in the printing mode, and in this case, the resonant frequency of the resonant circuit 240 is determined by the first capacitor C1.

The second capacitor C2 is connected in series with the switching part TR to be connected in parallel with, or to be disconnected from, the first capacitor C1 in accordance with the switching of the switching part TR.

More specifically, the switching part TR is activated in accordance with the duty ratio control signal having a low voltage level in the standby mode, and in this case, the resonant frequency of the resonant circuit 240 is determined by combining the resonant frequency of the first capacitor C1 and the resonant frequency of the second capacitor C2 according to the combined capacitance of the first and the second capacitors C1, C2. In other words, the resonant frequency of the resonant circuit 240 is formed to be the variable resonant frequency according to the combined capacitance of the first capacitor C1 and the second capacitor C2.

The circuit shown in FIGS. 3 and 4 also includes resistors R1, R2, R3, R6, and R7 connected as shown in FIGS. 3 and 4.

The signal controlling part 260 may be formed as one integrated circuit (IC). According to one aspect of the invention, an NCP1207 controller may be used as the signal controlling part 260.

The signal controlling part 260 outputs a switching signal to control operation of the M_TR of the power converting part 220, blocks the switching signal when receiving an overcurrent detection signal of the overcurrent detecting part 280, changes the frequency of the switching signal in accordance with the impedance variance of the load of the power converting part 220, and outputs the result.

More specifically, the signal controlling part 260 generates and outputs a switching signal according to the quasi-resonant controlling, in which the M_TR starts a turn-on state to trigger a new cycle when a voltage difference across the M_TR reaches a minimum voltage during a change from a turn-on state to a turn-off state.

Additionally, the signal controlling part 260 receives the primitive switching signal, which is resonated in accordance with the resonant frequency, by the first capacitor C1, when the TR of the resonant circuit 240 is inactivated in the printing mode. As a result, the signal controlling part 260 in the printing mode outputs a switching signal having the same frequency as the switching signal output from the resonant circuit 240. On the contrary, the TR of the resonant circuit 240 is activated in the standby mode, and accordingly the signal controlling part 260 receives the primitive switching signal which is resonated in accordance with the variable resonant frequency formed based on the combined capacitance of the first and the second capacitors C1, C2. As a result, the signal controlling part 260 in the standby mode outputs a switching signal with a lower frequency than the switching signal output from the resonant circuit 240, and accordingly the output interval of the switching signal is shortened. This will be explained in greater detail below.

Figure 5:
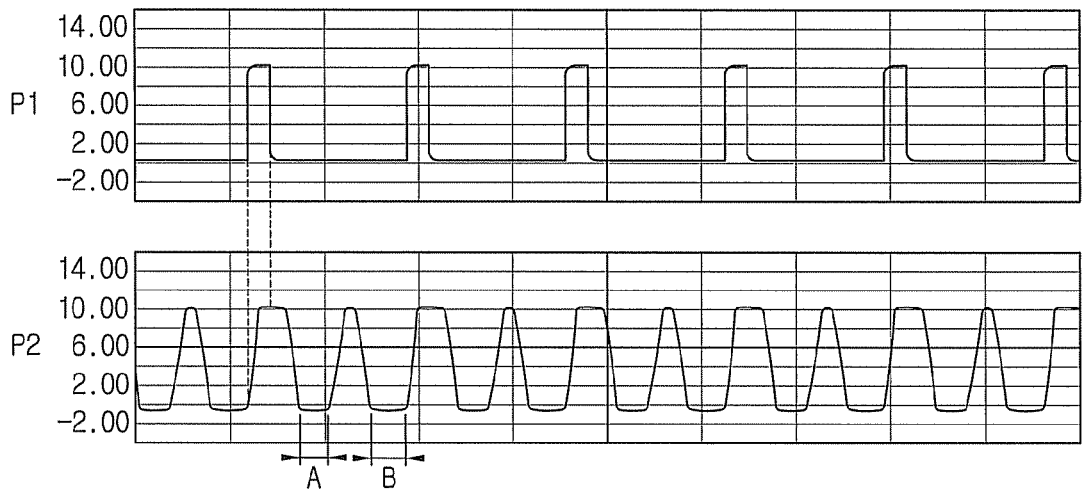
FIG. 5 is a diagram of waveforms to explain the operation of the SMPS device of FIGS. 3 and 4 according to an aspect of the invention.
Figure 6:
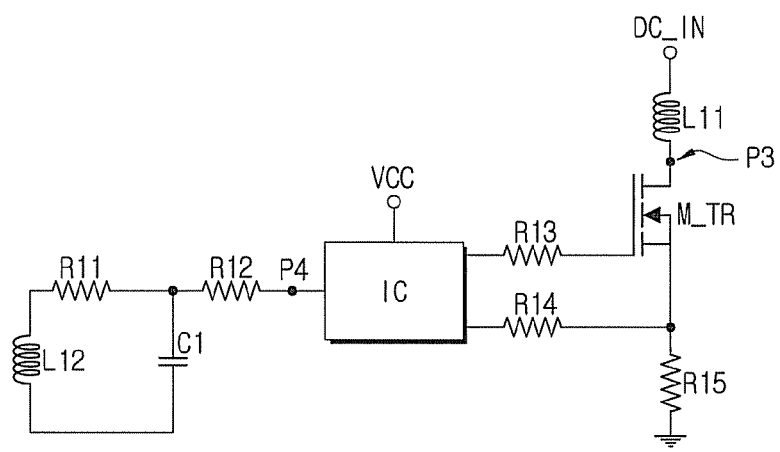
FIG. 6 is a circuit diagram illustrating a part of an SMPS device performing a quasi-resonant control according to the related art.

FIG. 5 is a diagram of waveforms to explain the operation of the SMPS device of FIGS. 3 and 4 according to an aspect of the invention. The graph at the top represents the switching signal detected at point P1 in FIGS. 3 and 4, and the graph at the bottom represents the primitive switching signal detected at point P2 in FIGS. 3 and 4.

Figure 7:
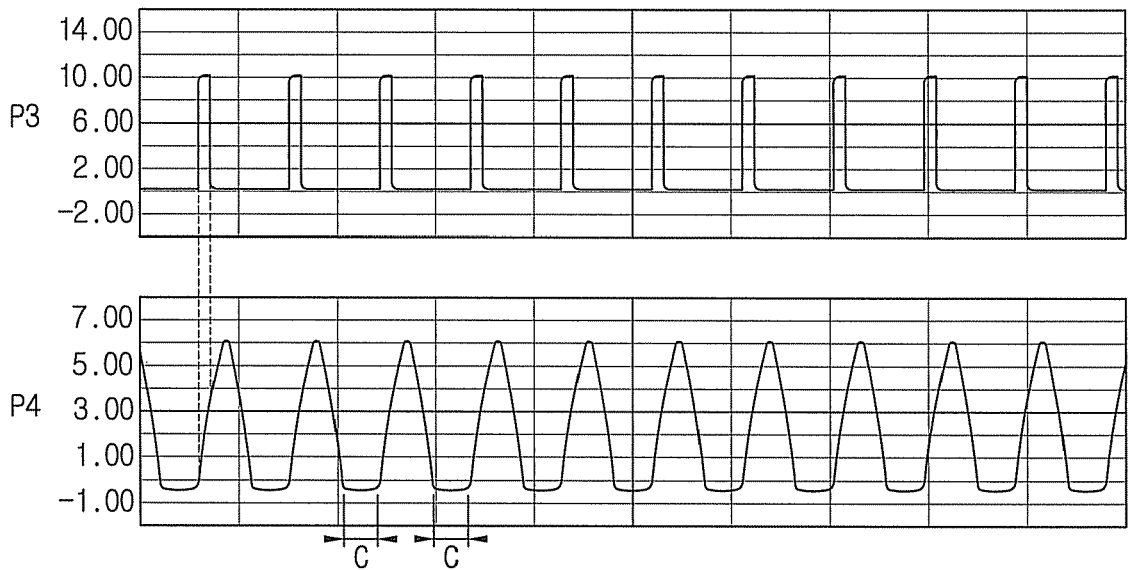
FIG. 7 is a graph illustrating waveforms in the SMPS device of FIG. 6 according to the related art.
Figure 8:
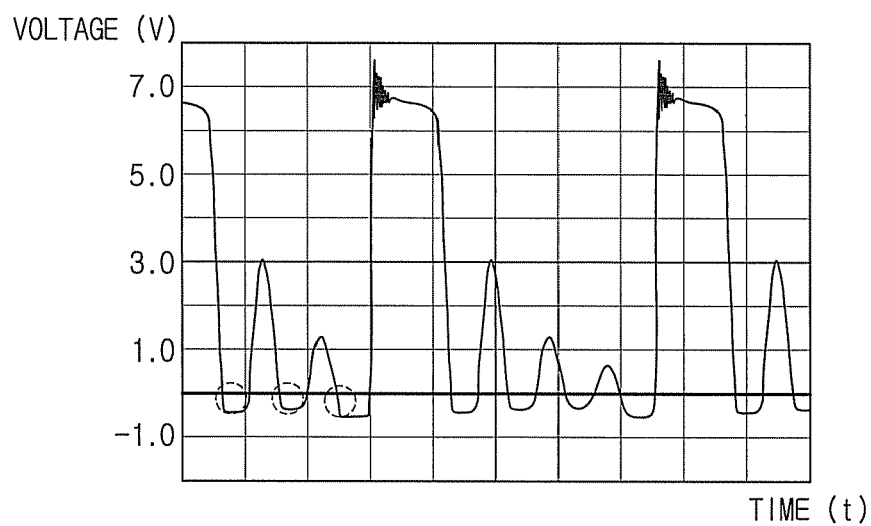
FIG. 8 is a graph explaining the operation of the SMPS device of FIG. 6 according to the related art in response to the waveforms illustrated in FIG. 7.

Referring now to FIGS. 3 through 5, the resonant circuit 240, during the standby mode, has the variable resonant frequency due to the second capacitor C2, and accordingly the duty ratio of the primitive switching signal is varied from the one shown in FIG. 7. In other words, the pulses of the example of FIG. 7 according to the related art are formed in accordance with the same duty ratio, and as a result, the 0 voltage period C sensed by the signal controlling part 260 increases.

For example, when an NCP1207 controller is used as the signal controlling part 260 in an SMPS device according to an aspect of the invention, a switching signal is output when 0 voltage is detected and then voltage under 0 is detected for more than 8 μs of time. Accordingly, a switching signal is outputted after 8 μs of time with respect to the primitive switching signal as shown in the related art.

On the contrary, and with reference to FIG. 5, because the harmonics of the primitive switching signal are delayed for a reference time before being output due to the variable resonant frequency, a time before outputting a switching signal may be delayed. Accordingly, an interval A may be formed, which includes the time point of detecting more than 0 voltage within 8 μs of time from the detection of 0 voltage, and accordingly does not output a switching signal. However, in an interval B, which does not include the time point of detecting more than 0 voltage within 8 μs of time from the detection of 0 voltage, a switching signal is output in accordance with the primitive switching signal.

According to an aspect of the invention, the duty ratio of the primitive switching signal is variably formed by adjusting the capacitance of the second capacitor C2 such that a time of outputting the primitive switching signal below 0 voltage to the signal controlling part 260 can be adjusted, and the output of the switching signal from the signal controlling part 260 can be blocked in the 0 voltage detecting period.

Accordingly, the switching signal is formed at a low frequency, and EMI, which increases in proportion to the frequency, is decreased, and the power loss in the M_TR can be prevented during switching operations according to the respective switching signals.

Additionally, the EMI, which increases in proportion to the increase of frequency of the switching signal due to harmonics, can be prevented when the impedance of the load decreases according to the quasi-resonant controlling method.

Additionally, a power loss due to increase of frequency of the switching signal and the switching operation of the switching transistor can be prevented.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. A switching mode power supply (SMPS) device comprising:
    a power converting part that converts an input voltage into an output voltage according to a switching signal, and outputs a primitive switching signal for use in varying a frequency of the switching signal based on power drawn by a load receiving the output voltage;
    a resonant circuit that changes a duty ratio of the primitive switching signal using a variable resonant frequency in accordance with a variance of an impedance of the load; and
    a signal controlling part that compares a voltage of the primitive switching signal, resonated in accordance with the variable resonant frequency, with a reference voltage, and varies the frequency of the switching signal and outputs the switching signal having the varied frequency when the voltage of the primitive switching signal is maintained below the reference voltage for longer than a reference time.

2. The SMPS device of claim 1, wherein the resonant circuit comprises:
    an impedance detecting part that detects the variance of the impedance of the load and outputs a duty ratio control signal in accordance with the detected impedance; and
    a duty ratio adjusting part that changes the duty ratio of the primitive switching signal in response to the duty ratio control signal.

3. The SMPS device of claim 2, wherein the duty ratio adjusting part comprises:
    a first capacitor to resonate the primitive switching signal;
    a first switching part activated in response to the duty ratio control signal; and
    a second capacitor connected in series with the first switching part, the series connection of the second capacitor and the first switching part being connected in parallel with the first capacitor so that the second capacitor forms a variable resonant frequency of the resonant circuit in cooperation with the first capacitor when the first switching part is activated.

4. The SMPS device of claim 2, wherein the impedance detecting part comprises a third capacitor that is formed to have a charging voltage varying in accordance with the variance of the impedance of the load, and outputs the charging voltage as the duty ratio control signal.

5. The SMPS device of claim 1, further comprising an overcurrent detecting part that outputs an overcurrent detection signal to the signal controlling part when an overcurrent flows through the power converting part.

6. The SMPS device of claim 5, wherein the resonant circuit is connected in parallel with the overcurrent detecting part.

7. The SMPS device of claim 1, wherein the power converting part further comprises a second switching part that varies the input voltage by being activated in response to the switching signal.

8. The SMPS device of claim 1, wherein the power converting part comprises:
    a primary winding to which the input voltage is supplied;
    a first secondary winding coupled to the primary winding and inducing the output voltage; and
    a second secondary winding coupled to the primary winding and inducing the primitive switching signal.

9. The SMPS device of claim 8, wherein the resonant circuit comprises:
    a first capacitor that is connected to the second secondary winding and outputs the resonated primitive switching signal;
    a second capacitor; and
    a first transistor connected in series with the second capacitor, the series connection of the first transistor and the second capacitor being connected in parallel with the second capacitor, the first transistor being activated in accordance with the variance of the impedance of the load to selectively connect the first capacitor and the second capacitor in parallel.

10. The SMPS device of claim 9, wherein the power converting part further comprises a second transistor that changes the input voltage supplied to the primary winding in response to the switching signal.

11. The SMPS device of claim 10, further comprising a resistor connected to the second transistor that outputs a voltage difference across the resistor as an overcurrent detection signal to the signal controlling part when an overcurrent flows in the primary winding.

12. The SMPS device of claim 11, wherein the resonant circuit further comprises a third capacitor connected in parallel with the resistor that is charged to a certain voltage in accordance with the voltage difference across the resistor that varies according to the variance of the impedance of the load, and outputs the charged voltage as a duty ratio control signal to the first transistor.

13. An image forming apparatus that receives an input voltage and print data, and performs printing in accordance with the print data, the image forming apparatus comprising:
    a print controlling part that receives the print data and converts the print data into a bitmap image;
    a print engine part that prints the bitmap image onto a print medium; and
    a switching mode power supply (SMPS) device that converts the input voltage into one or more output voltages received by the print controlling part and the print engine part according to a switching signal, and varies a frequency of the switching signal in accordance with operation modes of the print controlling part and the print engine part.

14. The image forming apparatus of claim 13, wherein the operation modes comprise:
   a printing mode in which the print engine part and the print controlling part are activated and operate to print the bitmap image onto the print medium, and
   a standby mode in which the print engine part and the print controlling part are inactivated; and
   wherein the SMPS device varies the frequency of the switching signal in the standby mode.

15. The image forming apparatus of claim 13, wherein the SMPS device comprises:
   a power converting part that converts the input voltage into the one or more output voltages according to the switching signal, and outputs a primitive switching signal for use in varying the frequency of the switching signal based on power drawn by the print engine part and the print controlling part receiving the one or more output voltages;
   a resonant circuit that changes a duty ratio of the primitive switching signal using a variable resonant frequency in accordance with a variance of an impedance of the print engine part and the print controlling part receiving the one or more output voltages; and
   a signal controlling part that compares a voltage of the primitive switching signal, resonated in accordance with the variable resonant frequency, with a reference voltage, and varies the frequency of the switching signal and outputs the switching signal having the varied frequency when the voltage of the primitive switching signal is maintained below the reference voltage for longer than a reference time.

16. A method of driving a switching mode power supply (SMPS) device that converts an input voltage into an output voltage according to a switching signal, and supplies the output voltage to a load, the method comprising:
   determining a variance of an impedance of the load; and
   varying a frequency of the switching signal when power supplied to the load is determined to decrease, wherein the varying of the frequency of the switching signal comprises,
   generating a primitive switching signal for use in varying the frequency of the switching signal;
   varying a resonant frequency to vary a duty ratio of the primitive switching signal; and
   resonating the primitive switching signal in accordance with the varied resonant frequency.

17. The method of claim 16, wherein the varying of the frequency of the switching signal further comprises:
   comparing a voltage of the primitive switching signal, resonated in accordance with the variable resonant frequency, with a reference voltage; and
   varying the frequency of the switching signal and outputting the switching signal having the varied frequency when the voltage of the primitive switching signal is maintained below the reference voltage for longer than a reference time.

18. The method of claim 16, wherein the varying of the resonant frequency comprises increasing a capacitance that determines the resonant frequency, thereby changing the duty ratio of the primitive switching signal.

19. A switching mode power supply (SMPS) device comprising:
   a power converting part that
   receives an input voltage,
   receives a switching signal having a controlled frequency,
   converts the input voltage into an output voltage according to the switching signal having the controlled frequency,
   outputs the output voltage to a load, and
   outputs a primitive switching signal for use in controlling a frequency of the switching signal having the controlled frequency based on power drawn by the load;
   a resonant circuit that
   receives the primitive switching signal,
   resonates the primitive switching signal at a resonant frequency determined by the power drawn by the load, and
   outputs the resonated primitive switching signal; and
   a signal controlling part that
   receives the resonated primitive switching signal,
   generates a second switching signal,
   controls a frequency of the second switching signal in accordance with the resonated primitive switching signal, and
   outputs the switching signal having the controlled frequency to the power converting part.

20. The SMPS device of claim 19, wherein the power converting part comprises:
   a primary winding that receives the input voltage;
   a first second winding, inductively coupled to the primary winding, that outputs the output voltage; and
   a second secondary winding, inductively coupled to the primary winding, that outputs the primitive switching signal.

21. The SMPS device of claim 19, wherein the resonant circuit:
   resonates the primitive switching signal at a first resonant frequency when the power drawn by the load meets a first power condition, thereby causing the primitive switching signal to have a first duty ratio; and
   resonates the primitive switching signal at a second resonant frequency when the power drawn by the load meets a second power condition, thereby causing the primitive switching signal to have a second duty ratio.

22. The SMPS device of claim 21, wherein the first power condition is a power condition in which the load draws a normal amount of power consumed in a normal operation of the load;
   wherein the second power condition is a power condition in which the load draws a standby amount of power consumed in a standby operation of the load; and
   wherein the standby amount of power is less than the normal amount of power.

23. The SMPS device of claim 21, wherein the primitive switching signal having the first duty ratio has a voltage that is below a 0 voltage for a first predetermined interval; and
   wherein the primitive switching signal having the second duty ratio has a voltage that is below a 0 voltage for a second predetermined interval.

24. The SMPS device of claim 19, wherein the signal controlling part:
   compares a voltage of the resonated primitive switching signal with a reference voltage;
   does not change the frequency of the switching signal when the voltage of the primitive switching signal is maintained below the reference voltage for shorter than or equal to a reference time; and
   changes the frequency of the switching signal when the voltage of the primitive switching signal is maintained below the reference voltage for longer than the reference time.

25. The SMPS device of claim 24, wherein the frequency of the switching signal is the same as a frequency of the primitive switching signal when the voltage of the primitive switching signal is maintained below the reference voltage for shorter than or equal to the reference time; and wherein the frequency of the switching signal is maintained below the frequency of the primitive switching signal when the voltage of the primitive switching signal is maintained below the reference voltage for longer than the reference time.

26. The SMPS device of claim 25, wherein the switching signal having the lower frequency prevents an amount of electromagnetic interference generated by the SMPS device from increasing when the voltage of the primitive switching signal is maintained below the reference voltage for longer than the reference time.

* * * * *